United States Patent [19]
Hirai

[11] Patent Number: 5,309,502
[45] Date of Patent: May 3, 1994

[54] RADIO TELEPHONE HAVING A CORDLESS OR CELLULAR ONLY MODE AND A CORDLESS/CELLULAR MODE

[75] Inventor: Yuji Hirai, Fukuoka, Japan

[73] Assignee: Matsushita Electric Industrial Co., Ltd., Osaka, Japan

[21] Appl. No.: 738,414

[22] Filed: Jul. 31, 1991

[30] Foreign Application Priority Data

Aug. 7, 1990 [JP] Japan .................. 2-207531

[51] Int. Cl.$^5$ .......................... H04M 11/00
[52] U.S. Cl. ...................... 379/59; 379/58; 379/61
[58] Field of Search .............. 379/58, 59, 61

[56] References Cited

U.S. PATENT DOCUMENTS

| | | | |
|---|---|---|---|
| 4,508,937 | 5/1985 | Burger et al. | 379/373 |
| 4,989,230 | 1/1991 | Gillig et al. | 379/61 |
| 5,210,785 | 1/1993 | Saito et al. | 379/58 |
| 5,212,684 | 5/1993 | MacNamee et al. | 379/61 X |

Primary Examiner—Curtis Kuntz
Assistant Examiner—G. J. Oehling
Attorney, Agent, or Firm—Lowe, Price, LeBlanc & Becker

[57] ABSTRACT

A radio telephone includes a cordless telephone fixed set and a mobile set. The cordless telephone fixed set is connected to a telephone line. The mobile set includes a first transmitter and a first receiver for radio communication with the cordless telephone fixed set. In addition, the mobile set includes a second transmitter and a second receiver for radio communication with an external base station. The mobile set includes a device for instructing a communication start, a device for detecting an answer signal outputted from the cordless telephone fixed set, a device for enabling the first transmitter to transmit a talking start signal when the instructing device instructs the communication start, and a device for, in cases where the first transmitter transmits the talking start signal but the detecting device fails to detect the answer signal, enabling the second transmitter to transmit a talking start signal.

4 Claims, 5 Drawing Sheets

5,309,502

RADIO TELEPHONE HAVING A CORDLESS OR CELLULAR ONLY MODE AND A CORDLESS/CELLULAR MODE

BACKGROUND OF THE INVENTION

This invention relates to a radio telephone.

A general radio telephone network such as an automobile telephone network includes a base station or base stations each having a service area with a radius of several kilometers to several tens of kilometers. Mobile stations located within a service area can communicate with a related base station, and thereby can be coupled to telephone lines via the base station. As used herein, the general radio telephone network refers to a wide area, multi-user, radio telephone system, typically comprising a cellular mobile telephone system including cellular base station sites and portable and/or mobile cellular transceivers.

A general home-use cordless telephone has a fixed set and a mobile set. The fixed set is directly connected to a telephone line. The mobile set can communicate with the fixed set by radio, and thereby can be coupled to the telephone line via the fixed set. The fixed set has a service area corresponding to a distance of about 10 meters to 100 meters.

It is advantageous to combine a radio telephone and a cordless telephone.

SUMMARY OF THE INVENTION

It is an object of this invention to provide an improved radio telephone.

A first aspect of this invention provides a radio telephone comprising a cordless telephone fixed set connected to a telephone line; and a mobile set including a first transmitter and a first receiver for radio communication with the cordless telephone fixed set, the mobile set including a second transmitter and a second receiver for radio communication with an external base station; wherein the mobile set comprises means for instructing a communication start; means for detecting an answer signal outputted from the cordless telephone fixed set; means for enabling the first transmitter to transmit a talking start signal when the instructing means instructs the communication start; and means for, in cases where the first transmitter transmits the talking start signal but the detecting means fails to detect the answer signal, enabling the second transmitter to transmit a talking start signal.

A second aspect of this invention provides a radio telephone comprising a cordless telephone fixed set connected to a telephone line; and a mobile set including a first transmitter and a first receiver for radio communication with the cordless telephone fixed set, the mobile set including a second transmitter and a second receiver for radio communication with an external base station; wherein the mobile set comprises selection means for selecting one of a portable telephone mode, a cordless telephone mode, and an auto mode; means for instructing a communication start; means for detecting an answer signal outputted from the cordless telephone fixed set; means for, in cases where the selection means selects the portable telephone mode, activating the second transmitter and the second receiver to enable radio communication with the external base station when the instructing means instructs the communication start; means for, in cases where the selection means selects the cordless telephone mode, activating the first transmitter and the first receiver to execute radio communication with the cordless telephone fixed set when the instructing means instructs the communication start; means for, in cases where the selection means selects the auto mode, enabling the first transmitter to transmit a talking start signal when the instructing means instructs the communication start; and means for, in cases where the first transmitter transmits the talking start signal but the detecting means fails to detect the answer signal, enabling the second transmitter to transmit a talking start signal.

A third aspect of this invention provides a radio telephone comprising a cordless telephone fixed set connected to a telephone line; and a mobile set including a first transmitter and a first receiver for radio communication with the cordless telephone fixed set, the mobile set including a second transmitter and a second receiver for radio communication with an external base station; wherein the mobile set comprises means for generating a first sound in response to a call signal outputted from the cordless telephone fixed set; and means for generating a second sound in response to a call signal outputted from the external base station, the second sound being different from the first sound.

A fourth aspect of this invention provides a hybrid radio telephone for radio communication with a cordless telephone fixed set and an external base station, comprising a cordless telephone unit for radio communication with the cordless telephone fixed set; a radio telephone unit for radio communication with the external base station; means for detecting whether or not the cordless telephone unit fails to communicate with the cordless telephone fixed set; and means for, when the detecting means detects that the cordless telephone unit fails to communicate with the cordless telephone fixed set, automatically activating and enabling the radio telephone unit to communicate with the base station to compensate for a failure in communication between the cordless telephone unit and the cordless telephone fixed set.

DESCRIPTION OF THE PREFERRED EMBODIMENT

Figure 5:
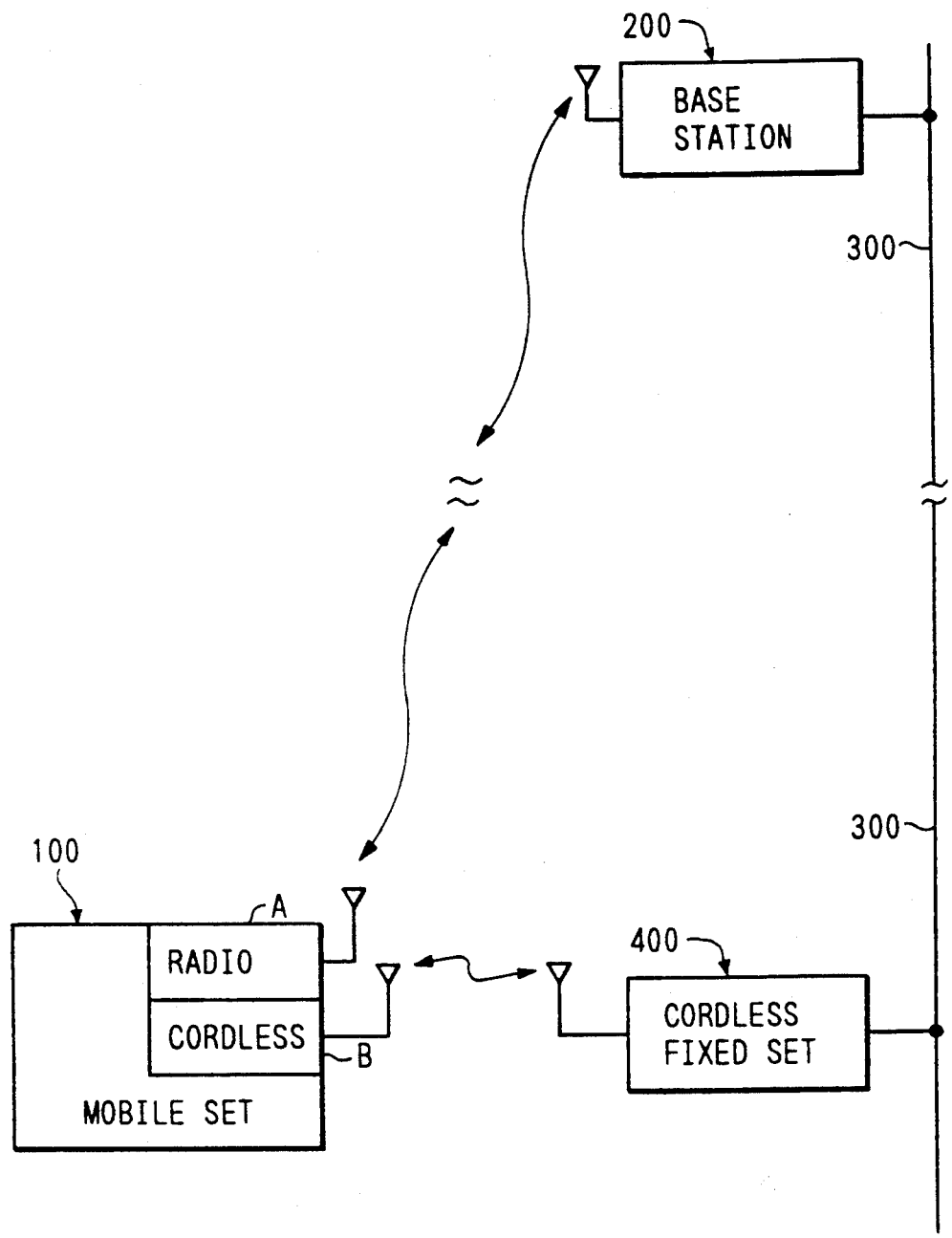
FIG. 5 is a diagram of a base station, a cordless telephone fixed set, and a mobile telephone set according to an embodiment of this invention.

Firstly, a general aspect of an embodiment this invention will be described. With reference to FIG. 5, a mobile telephone set 100 includes a radio telephone unit (a portable telephone unit) A and a cordless telephone unit B. The radio telephone unit A is designed for radio communication with a base station 200 which is connected to a telephone line 300. The cordless telephone unit B is designed for radio communication with a cordless telephone fixed set 400 which is connected to the telephone line 300.

The mobile set 100 includes an active-unit selection switch which can be changed among three different positions corresponding to "radio telephone (portable telephone)", "cordless telephone", and "auto" respectively. When the active-unit selection switch assumes the radio-telephone position, the radio telephone unit A is selected as an active unit. When the active-unit selection switch assumes the cordless telephone position, the cordless telephone unit B is selected as an active unit. In the case where the active-unit selection switch assumes the auto position, when a communication start is required, the cordless telephone unit B is preferentially activated to transmit a talking start signal. When the cordless telephone fixed set 400 successfully receives the talking start signal from the cordless telephone unit B, the cordless telephone fixed set 400 transmits an answer signal. After the cordless telephone unit B successfully receives the answer signal from the cordless telephone fixed set 400, speech communication can be performed via the cordless telephone unit B and the cordless telephone fixed set 400. If the cordless telephone unit B does not receive any answer signal from the cordless telephone fixed set 400 after the cordless telephone unit B transmits the talking start signal, the radio telephone unit A is activated to transmit a talking start signal. In this case, speech communication can be performed via the radio telephone unit A and the base station 200 in place of the cordless telephone route.

Figure 1:
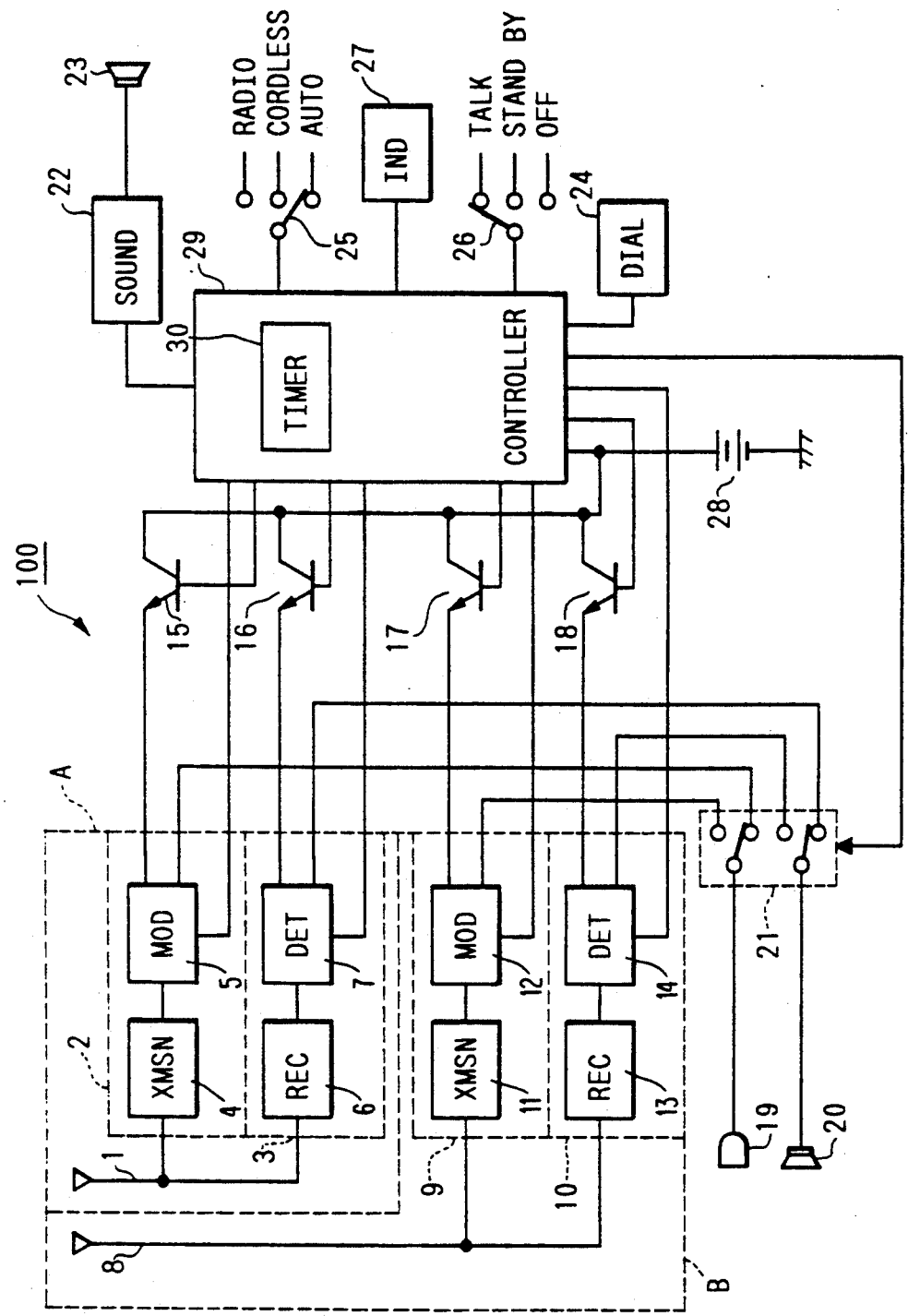
FIG. 1 is a block diagram of a mobile telephone according to an embodiment of this invention.

The embodiment of this invention will be described in detail hereinafter. With reference to FIG. 1, the mobile telephone set 100 includes the radio telephone unit A and the cordless telephone unit B. The radio telephone unit A has an antenna 1, a transmitter 2, and a receiver 3. The transmitter 2 includes an RF transmission circuit 4 and a modulation circuit 5. The RF transmission circuit 4 is connected to the antenna 1, and is preceded by the modulation circuit 5. The receiver 3 includes a reception circuit 6 and a detection circuit 7. The reception circuit 6 is connected to the antenna 1, and is followed by the detection circuit 7.

The cordless telephone unit B has an antenna 8, a transmitter 9, and a receiver 10. The transmitter 9 includes an RF transmission circuit 11 and a modulation circuit 12. The RF transmission circuit 11 is connected to the antenna 8, and is preceded by the modulation circuit 12. The receiver 10 includes a reception circuit 13 and a detection circuit 14. The reception circuit 13 is connected to the antenna 8, and is followed by the detection circuit 14.

The transmitter 2 of the radio telephone unit A, the receiver 3 of the radio telephone unit A, the transmitter 9 of the cordless telephone unit B, and the receiver 10 of the cordless telephone unit B are connected to a power supply 28 via transistors 15, 16, 17, and 18 respectively. The transistors 15, 16, 17, and 18 serve as switches. When the transistors 15, 16, 17, and 18 are conductive, the devices 2, 3, 9, and 10 are fed with electric power from the power source 28 so that the devices 2, 3, 9, and 10 are activated. When the transistors 15, 16, 17, and 18 are nonconductive, the feed of electric power to the devices 2, 3, 9, and 10 is inhibited so that the devices 2, 3, 9, and 10 are deactivated. The transistors 15, 16, 17, and 18 are controlled by signals outputted from a controller 29.

A microphone 19 is selectively connected to the transmitter 2 of the radio telephone unit A or the transmitter 9 of the cordless telephone unit B via a first section of a switch 21. A loudspeaker 20 is selectively connected to the receiver 3 of the radio telephone unit A or the receiver 10 of the cordless telephone unit B via a second section of the switch 21. Specifically, the switch 21 is changeable between first and second positions. When the switch 21 assumes the first position, the microphone 19 and the loudspeaker 20 are connected to the radio telephone unit A. When the switch 21 assumes the second position, the microphone 19 and the loudspeaker 20 are connected to the cordless telephone unit B. The switch 21 is controlled by an output signal from the controller 29.

A call signal generator 22 generates a call signal in response to a signal outputted from the controller 29. A sound generator 23 produces a call sound in response to the call signal fed from the call signal generator 22. The signal outputted to the call signal generator 22 from the controller 29 is changeable between two states, and thus the call sound produced by the sound generator 23 is changeable between two different types corresponding to "radio telephone" and "cordless telephone" respectively. A dial signal can be fed to the controller 29 via a dial input device 24.

An active-unit selector includes a switch 25 which can be changed among three different positions corresponding to "radio telephone", "cordless telephone", and "auto" respectively. The switch 25 enables the generation of an active-unit selection signal representing which of "radio telephone", "cordless telephone", and "auto" is selected. The active-unit selection signal is fed from the switch 25 to the controller 29.

An operation-mode selector includes a switch 26 which can be changed among three different positions corresponding to "talking", "stand by", and "off" respectively. The switch 26 enables the generation of an operation-mode selection signal representing which of "talking", "stand by", and "off" is selected. The operation-mode selection signal is fed from the switch 26 to the controller 29.

An indicator 27, responsive to a signal outputted from the controller 29, indicates one of the radio telephone unit A and the cordless telephone unit B which is currently in use. In addition, the indicator 27 can indicate that the radio telephone unit A and the cordless telephone unit B are in stand-by states.

The controller 29 and the associated devices are activated by the power supply 28. The power supply 28 is composed of, for example, a battery.

The controller 29 is directly connected to the transmitter 2 and the receiver 3 of the radio telephone unit A, and the transmitter 9 and the receiver 10 of the cordless telephone unit B. The controller 29 controls these devices 2, 3, 9, and 10. In addition, the controller 29 receives an output signal from the receiver 3 of the radio telephone unit A which includes information related to a radio telephone call signal. Furthermore, the controller 29 receives an output signal from the receiver 10 of the cordless telephone unit B which includes information related to a cordless telephone call signal.

The controller 29 includes a microcomputer having a combination of a CPU, a ROM, a RAM, and an I/O circuit. The controller 29 operates in accordance with a program stored in the internal ROM. The controller 29 includes a timer 30.

The radio telephone unit A can communicate with the base station 200 (see FIG. 5) in a known way. The cordless telephone unit B can communicate with the cordless telephone fixed set 400 (see FIG. 5) in a known way.

Figure 2:
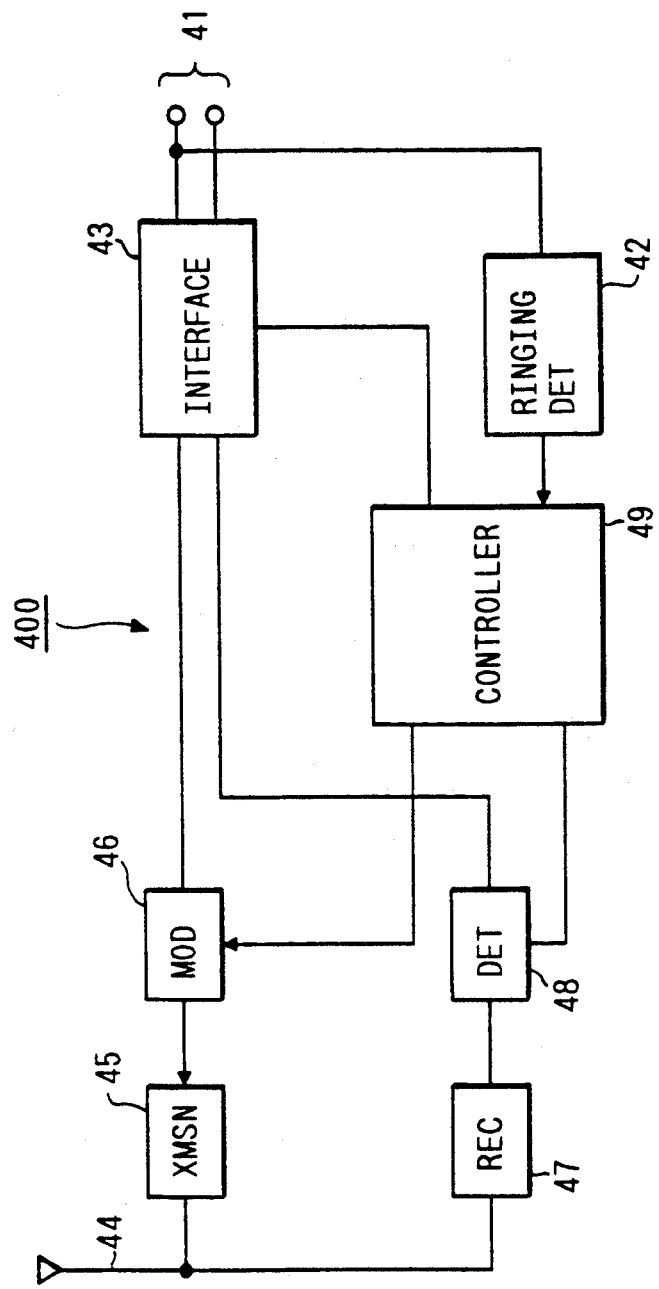
FIG. 2 is a block diagram of a cordless telephone fixed set which can communicate with the mobile telephone of FIG. 1.

FIG. 2 shows the structure of the cordless telephone fixed set 400. As shown in FIG. 2, the cordless telephone fixed set 400 includes a ringing-signal detector 42 and an interface circuit 43 which are connected to telephone lines 41. It should be noted that the telephone lines 41 correspond to the telephone line 300 of FIG. 5. The cordless telephone fixed set 400 also includes an antenna 44, an RF transmission circuit 45, a modulation circuit 46, a reception circuit 47, a detection circuit 48, and a controller 49. The RF transmission circuit 45 is connected to the antenna 44, and is preceded by the modulation circuit 46. The reception circuit 47 is connected to the antenna 44, and is followed by the detection circuit 48. The modulation circuit 46 and the detection circuit 48 are connected to the telephone lines 41 via the interface circuit 43. The ringing-signal detector 42 functions to receive and detect a ringing signal transmitted via the telephone lines 41. The ringing-signal detector 42 informs the controller 49 of the reception of a ringing signal. The controller 49 is connected to the modulation circuit 46, the detection circuit 48, and the interface circuit 43. The controller 49 includes a microcomputer having a combination of a CPU, a ROM, a RAM, and an I/O circuit. The controller 49 operates in accordance with a program stored in the internal ROM.

Returning to FIG. 1, the controller 29 operates in accordance with a program as described previously. The program includes a main section. The main section of the program includes a step which detects the current position of the switch 25 by referring to the active-unit selection signal fed via the switch 25. The main section of the program also includes a step which detects the current position of the switch 26 by referring to the operation-mode selection signal fed via the switch 26.

Figure 3:
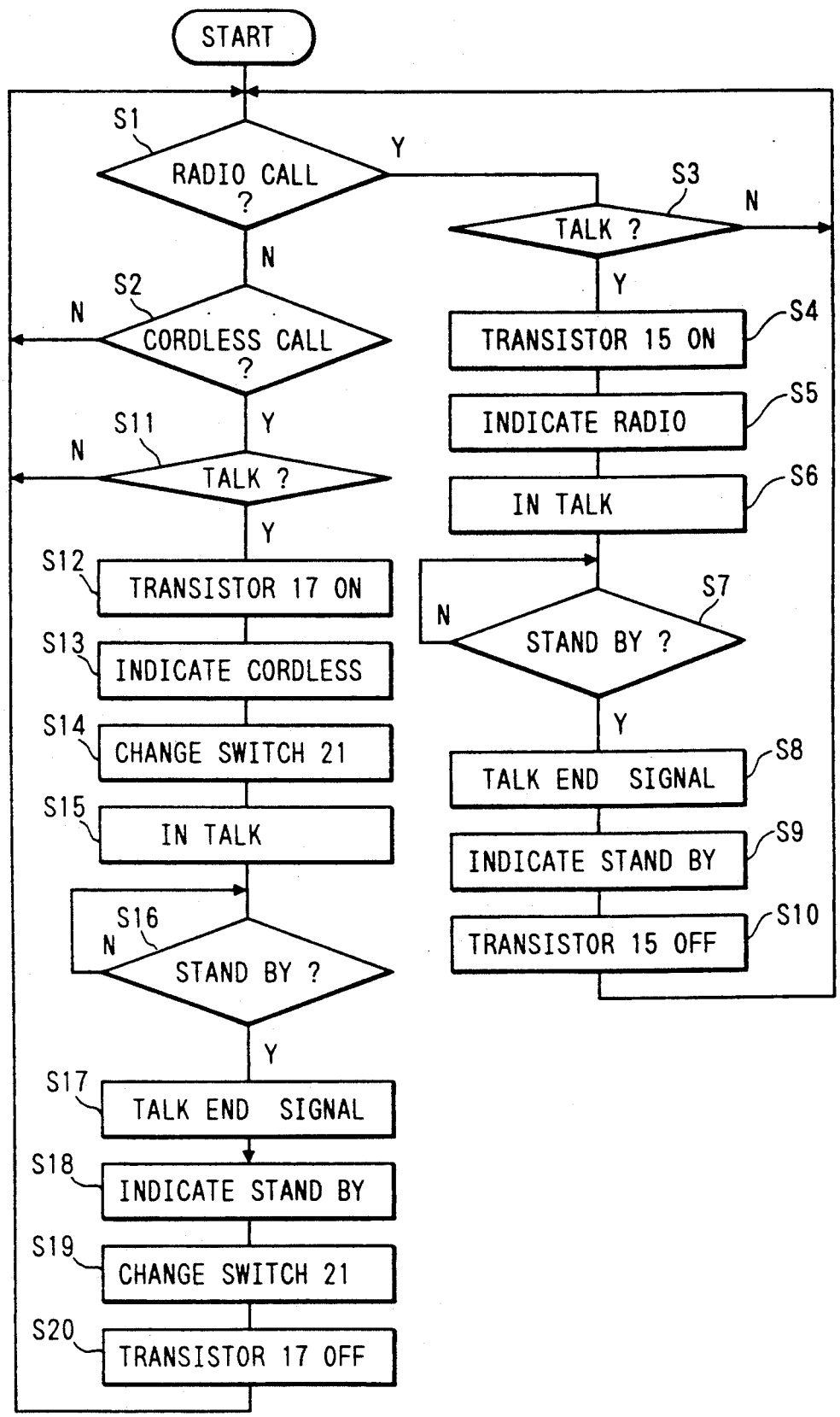
FIG. 3 is a flowchart of a section of a program operating the controller of FIG. 1.

In the case where the current position of the switch 25 corresponds to "auto" and the current position of the switch 26 corresponds to "stand by", the controller 29 makes and holds the transistors 16 and 18 conductive according to other steps of the main section of the program. As a result, the receiver 3 of the radio telephone unit A and the receiver 10 of the cordless telephone unit B are continuously activated. Furthermore, in this case, a first sub section of the program is executed. FIG. 3 is a flowchart of the first sub section of the program.

As shown in FIG. 3, a first step S1 of the first sub section of the program decides whether or not a call signal addressed to the present radio telephone and transmitted from the base station 200 is currently received by referring to the output signal from the receiver 3 of the radio telephone unit A. When a call signal from the base station 200 is not received, the program advances to a step S2. When a call signal from the base station 200 is received, the program advances to a step S3.

The step S3 decides whether or not the current position of the operation-mode selection switch 26 corresponds to "talking". When the current position of the operation-mode selection switch 26 corresponds to "talking", the program advances to a step S4. Otherwise, the program returns to the step S1.

The step S4 makes the transistor 15 conductive so that the transmitter 2 of the radio telephone unit A will be activated. In addition, the step S4 controls the transmitter 2 so that the transmitter 2 will transmit an answer signal. A step S5 following the step S4 controls the indicator 27 so that the indicator 27 will indicate the radio telephone unit A being currently in use.

A step S6 following the step S5 controls the transmitter 2 and the receiver 3 of the radio telephone unit A so that speech communication can be enabled via the radio telephone unit A. After the step S6, the program advances to a step S7. The step S7 decides whether or not the current position of the operation-mode selection switch 26 corresponds to "stand by". When the current position of the operation-mode selection switch 26 corresponds to "stand by", the program advances to a step S8. Otherwise, the step S7 is repeated.

The step S8 controls the transmitter 2 of the radio telephone unit A so that the transmitter 2 will transmit a talking end signal. A step S9 following the step S8 controls the indicator 27 so that the indicator 27 will indicate "stand by". A step S10 following the step S9 makes the transistor 15 nonconductive so that the transmitter 2 of the radio telephone unit A will be deactivated. After the step S10, the program returns to the step S1.

The step S2 decides whether or not a call signal addressed to the present cordless telephone and transmitted from the cordless telephone fixed set 400 is currently received by referring to the output signal from the receiver 10 of the cordless telephone unit B. When a call signal from the cordless telephone fixed set 400 is received, the program advances to a step S11. Otherwise, the program returns to the step S1.

The step S11 decides whether or not the current position of the operation-mode selection switch 26 corresponds to "taking". When the current position of the operation-mode selection switch 26 corresponds to "talking", the program advances to a step S12. Otherwise, the program returns to the step S1.

The step S12 makes the transistor 17 conductive so that the transmitter 9 of the cordless telephone unit B will be activated. In addition, the step S12 controls the transmitter 9 so that the transmitter 9 will transmit an answer signal or a talking start signal. A step S13 following the step S12 controls the indicator 27 so that the indicator 27 will indicate the cordless telephone unit B being currently in use. A step S14 following the step S13 controls the switch 21 so that the microphone 19 and the loudspeaker 20 will be connected to the cordless telephone unit B.

A step S15 following the step S14 controls the transmitter 9 and the receiver 10 of the cordless telephone unit B so that speech communication can be enabled via the cordless telephone unit B. After the step S15, the program advances to a step S16. The step S16 decides whether or not the current position of the operation-mode selection switch 26 corresponds to "stand by". When the current position of the operation-mode selection switch 26 corresponds to "stand by", the program advances to a step S17. Otherwise, the step S16 is repeated.

The step S17 controls the transmitter 9 of the cordless telephone unit B so that the transmitter 9 will transmit a talking end signal. A step S18 following the step S17 controls the indicator 27 so that the indicator 27 will indicate "stand by". A step S19 following the step S18 controls the switch 21 so that the microphone 19 and the loudspeaker 20 will be connected to the radio telephone unit A. A step S20 following the step S19 makes the transistor 17 nonconductive so that the transmitter 9 of the cordless telephone unit B will be deactivated. After the step S20, the program returns to the step S1.

The operation of the mobile telephone set 100 which relates to the flowchart of FIG. 3 will be further described hereinafter. It is now assumed that, in the case where the mobile telephone set 100 is in the stand-by state, the base station 200 transmits an RF call signal addressed to the present radio telephone. The RF call signal is caught by the antenna 1 and is then received by the reception circuit 6 of the radio telephone unit A. The RF call signal is demodulated by the reception circuit 6 and the detection circuit 7 of the radio telephone unit A into a baseband call signal. The baseband call signal is outputted from the detection circuit 7 to the controller 29. In the controller 29, the reception of the call signal addressed to the present radio telephone is detected by the step S1 by referring to the output signal from the detection circuit 7. Then, the controller 29 controls the call signal generator 22 so that the sound generator 23 will produce call sound corresponding to "radio telephone". It is now assumed that the user changes the operation-mode selection switch 26 from the stand-by position to the talking position in response to the produced call sound. This change of the position of the operation-mode selection switch 26 is detected by the step S3. Then, the controller 29 makes the transistor 15 conductive at the step S4 so that the transmitter 2 of the radio telephone unit A is activated. The controller 29 controls the transmitter 2 so that the transmitter 2 will transmit an answer signal. Subsequently, the controller 29 controls the indicator 27 at the step S5 so that the indicator 27 will indicate "radio telephone". The controller 29 controls the transmitter 2 and the receiver 3 of the radio telephone unit A at the step S6 so that speech communication can be enabled via the radio telephone unit A. When the speech communication is completed, the user generally changes the operation-mode switch 26 to the stand-by position. This change of the position of the operation-mode switch 26 is detected by the step S7. Then, the controller 29 controls the transmitter 2 of the radio telephone unit A at the step S8 so that the transmitter 2 will transmit a talking end signal. In addition, the controller 29 controls the indicator 27 at the step S9 so that the indicator 27 will indicate "stand by". Subsequently, the controller 29 makes the transistor 15 nonconductive at the step S10 so that the transmitter 2 of the radio telephone unit A will be deactivated.

It is now assumed that the mobile telephone set 100 is in the stand-by state, and that a ringing signal is inputted into the cordless telephone fixed set 400 via the telephone lines 41. In the cordless telephone fixed set 400, the input ringing signal is detected by the ringing signal detector 42, and the detected ringing signal is fed to the controller 49. The controller 49 controls the modulation circuit 46 and the RF transmission circuit 45 in response to the detected ringing signal so that an RF call signal will be outputted from the RF transmission circuit 45 to the antenna 44. The RF call signal is radiated from the antenna 44. The radiated RF call signal is caught by the antenna 8 of the cordless telephone unit A. Then, the RF call signal is received by the reception circuit 13 of the cordless telephone unit B. The RF call signal is demodulated by the reception circuit 13 and the detection circuit 14 of the cordless telephone unit B into a baseband call signal. The baseband call signal is outputted from the detection circuit 14 to the controller 29. In the controller 29, the reception of the call signal is detected by the step S2 by referring to the output signal from the detection circuit 14. Then, the controller 29 controls the call signal generator 22 so that the sound generator 23 will produce call sound corresponding to "cordless telephone". It is now assumed that the user changes the operation-mode selection switch 26 from the stand-by position to the talking position in response to the produced call sound. This change of the position of the operationmode selection switch 26 is detected by the step S11. Then, the controller 29 makes the transistor 17 conductive at the step S12 so that the transmitter 9 of the cordless telephone unit B will be activated. The controller 29 controls the transmitter 9 so that the transmitter 9 will transmit an RF answer signal or a RF talking start signal via the antenna 8. Subsequently, the controller 29 controls the indicator 27 at the step S13 so that the indicator 27 will indicate "cordless telephone". In addition, the controller 29 controls the switch 21 at the step S14 so that the microphone 19 and the loudspeaker 20 will be connected to the cordless telephone unit B. Meantime, the RF answer signal outputted from the cordless telephone unit B is received by the reception circuit 47 of the cordless telephone fixed set 400 via the antenna 44. The received RF answer signal is demodulated by the detection circuit 48 into a corresponding baseband answer signal, which is fed to the controller 49. The controller 49 controls the interface circuit 43 in response to the baseband answer signal so that the telephone lines 41 will be closed and speech communication will be enabled. Meantime, in the cordless telephone unit B, the controller 29 controls the transmitter 9 and the receiver 10 of the cordless telephone unit B at the step S15 so that speech communication can be enabled via the cordless telephone unit B. When the speech communication is completed, the user generally changes the operation-mode switch 26 to the stand-by position. This change of the position of the operation-mode switch 26 is detected by the step S16. Then, the controller 29 controls the transmitter 9 of the cordless telephone unit B at the step S17 so that the transmitter 9 will transmit an RF talking end signal. In addition, the controller 29 controls the indicator 27 at the step S18 so that the indicator 27 will indicate "stand by". The controller 29 controls the switch 21 at the step S19 so that the microphone 19 and the loudspeaker 20 will be connected to the radio telephone unit A. The controller 29 makes the transistor 17 nonconductive at the step S20 so that the transmitter 9 of the cordless telephone unit B will be deactivated. Meantime, the RF talking end signal outputted from the cordless telephone unit B is received by the cordless telephone fixed set 400. In the cordless telephone fixed set 400, the controller 49 controls the interface circuit 43 in response to the talking end signal so that the telephone lines 41 will be opened.

Figure 4:
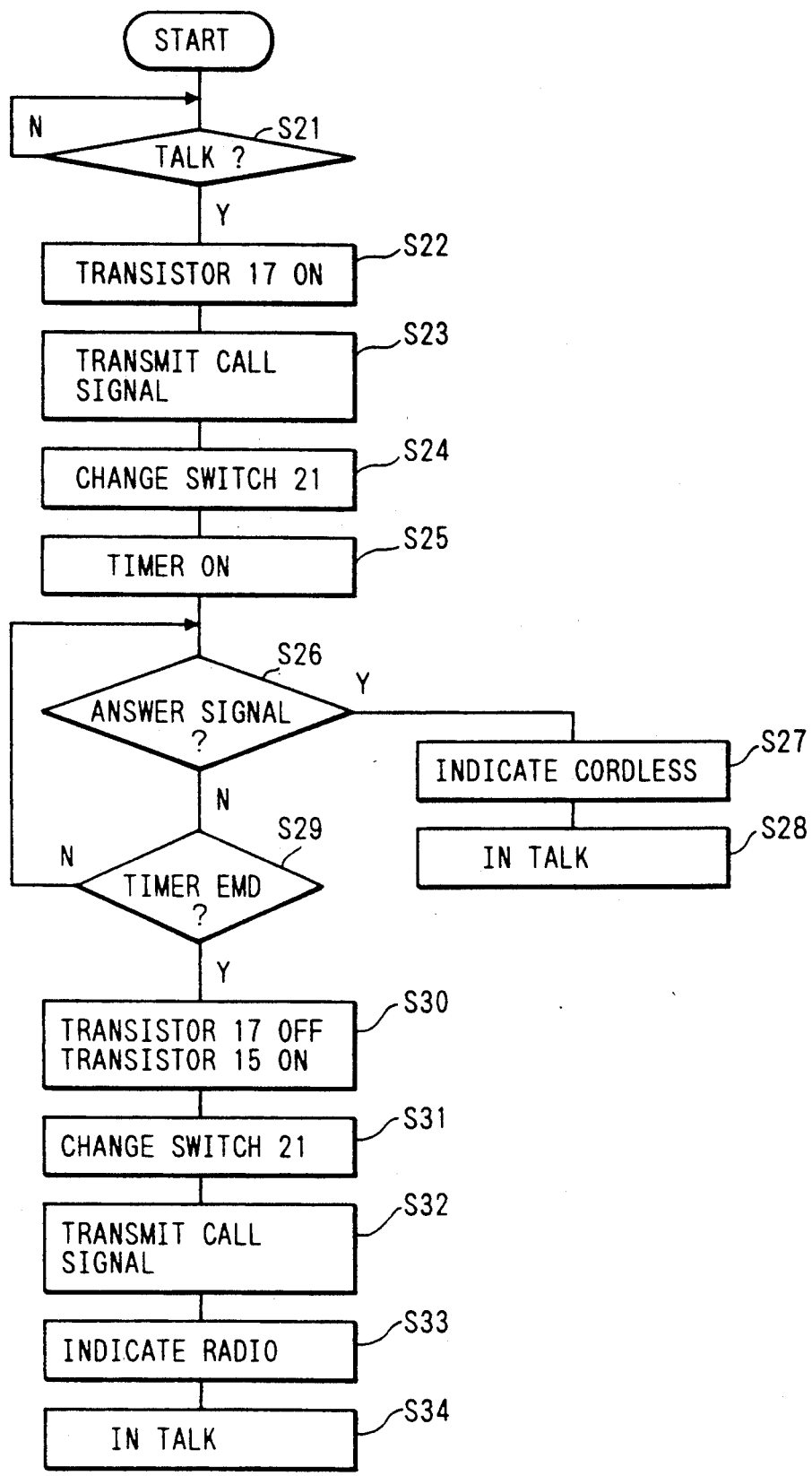
FIG. 4 is a flowchart of another section of the program operating the controller of FIG. 1.

Calling operation of the mobile telephone set 100 will be described hereinafter. It is now assumed that the user sets the position of the active-unit selection switch 25 to "auto" and changes the position of the operation-mode selection switch 26 to "talking" in order to perform a call. In this case, a second sub section of the program is executed. FIG. 4 is a flowchart of the second sub section of the program.

As shown in FIG. 4, a step S21 of the main section of the program decides whether or not the current position of the operation-mode switch 26 corresponds to "talking". When the current position of the operation-mode selection switch 26 corresponds to "talking", the program enters the second sub section and a first step S22 of the second sub section is executed. Otherwise, the step S21 is repeated.

The step S22 makes the transistor 17 conductive so that the transmitter 9 of the cordless telephone unit B will be activated. A step S23 following the step S22 controls the transmitter 9 of the cordless telephone unit B so that the transmitter 9 will transmit an RF call signal. A step S24 following the step S23 controls the switch 21 so that the microphone 19 and the loudspeaker 20 will be connected to the cordless telephone unit B. A step S25 following the step S24 starts the timer 30. After the step S25, the program advances to a step S26.

The step S26 decides whether or not an answer signal transmitted from the cordless telephone fixed set 400 is received by referring to the output signal from the receiver 9 of the cordless telephone unit B. When an answer signal is received, the program advances to a step S27. Otherwise, the program advances to a step S29.

The step S27 controls the indicator 27 so that the indicator 27 will indicate "cordless telephone". A step S28 following the step S27 controls the transmitter 9 and the receiver 10 of the cordless telephone unit B so that speech communication can be enabled via the cordless telephone unit B. The step S28 is followed by steps (not shown) similar to the steps of FIG. 3 which follow the step S15 of FIG. 3.

The step S29 decides whether or not a prescribed time determined by the timer 30 has elapsed since the moment of the start of the timer 30. If the prescribed time has not elapsed yet, the program returns to the step S26. Otherwise, the program advances to a step S30.

The step S30 makes the transistor 17 nonconductive so that the transmitter 9 of the cordless telephone unit B will be deactivated. In addition, the step S30 makes the transistor 15 conductive so that the transmitter 2 of the radio telephone set A will be activated.

A step S31 following the step S30 controls the switch 21 so that the microphone 19 and the loudspeaker 20 will be connected to the radio telephone unit A.

A step S32 following the step S31 controls the transmitter 2 of the radio telephone unit A so that the transmitter 2 will transmit a call signal toward the base station 200.

A step S33 following the step S32 controls the indicator 27 so that the indicator 27 will indicate "radio telephone".

A step S34 following the step S33 controls the transmitter 2 and the receiver 3 of the radio telephone unit A so that speech communication can be enabled via the radio telephone unit A. The step S34 is followed by steps (not shown) similar to the steps of FIG. 3 which follow the step S6 of FIG. 3.

The calling operation of the mobile telephone set 100 which relates to the flowchart of FIG. 4 will be further described hereinafter. It is now assumed that the user sets the position of the active-unit selection switch 25 to "auto" and also changes the position of the operation-mode selection switch 26 to "talking" in order to perform a call. In the controller 29, this change of the position of the operation-mode selection switch 26 is detected by the step S21. Then, the controller 29 makes the transistor 17 conductive at the step S22 so that the transmitter 9 of the cordless telephone unit B will be activated. The controller 29 controls the transmitter 9 of the cordless telephone unit B at the step S23 so that the transmitter 9 will transmit an RF call signal. The controller 29 controls the switch 21 at the step S24 so that the microphone 19 and the loudspeaker 20 will be connected to the cordless telephone unit B. Then, the controller 29 starts the timer 30 at the step S25.

Meantime, the RF call signal outputted from the cordless telephone unit B is generally caught by the antenna 44 and is then received by the reception circuit 47 of the cordless telephone fixed set 400. The RF call signal is demodulated by the reception circuit 47 and the detection circuit 48 into a baseband call signal, which is fed to the controller 49. The controller 49 controls the modulation circuit 46 in response to the baseband call signal so that an RF answer signal will be transmitted via the transmission circuit 45. In addition, the controller 49 controls the interface circuit 43 so that the telephone lines 41 will be closed.

The RF answer signal outputted from the cordless telephone fixed set 400 is generally caught by the antenna 8 and is then received by the receiver 10 of the cordless telephone unit B. The received answer signal is transmitted to the controller 29. In the controller 29, the reception of the answer signal is detected by the step S26. Then, the controller 29 controls the indicator 27 at the step S27 so that the indicator 27 will indicate "cordless telephone". In addition, the controller 29 controls the transmitter 9 and the receiver 10 of the cordless telephone unit B at the step S28 so that speech communication can be enabled via the cordless telephone unit B. Then, the user generally operates the dial input device 24 and inputs a dial signal into the controller 29 via the dial input device 24. The controller 29 controls the transmitter 9 of the cordless telephone unit B in response to the input dial signal so that a corresponding RF dial signal will be transmitted via the transmitter 9. The output RF dial signal from the cordless telephone unit B is generally caught by the antenna 44 and is then received by the reception circuit 47 of the cordless telephone fixed set 400. In the cordless telephone fixed set 400, the received RF dial signal is demodulated by the reception circuit 47 and the detection circuit 48 into the original dial signal, which is transmitted to the telephone lines 41 via the interface circuit 43. When speech communication is completed, the user generally changes the operation-mode selection switch 26 to the stand-by position. In response to this change of the operation-mode selection switch 26, the controller 29 functions to execute an operation similar to the previously-mentioned stand-by operation.

Generally, the cordless telephone unit B fails to receive the RF answer signal from the cordless telephone fixed set 400 in the case where the cordless telephone unit B lies outside the service area of the cordless telephone fixed set 400. Such a failure in the reception of the answer signal can be caused by other factors. It is now assumed that the cordless telephone unit B continues to fail to receive the RF answer signal and the prescribed time determined by the timer 30 has elapsed. In this case, the program advances from the step S29 to the step S30, so that the controller 29 makes the transistor 17 nonconductive but makes the transistor 15 conductive. As a result, the transmitter 9 of the cordless telephone unit B is deactivated while the transmitter 2 of the radio telephone set A is activated. Then, the controller controls the switch 21 at the step S31 so that the microphone 19 and the loudspeaker 20 will be connected to the radio telephone unit A. In addition, the controller 29 controls the transmitter 2 of the radio telephone unit A at the step S32 so that the transmitter 2 will transmit a call signal toward the base station 200. Subsequently, the controller 29 controls the indicator 27 at the step S33 so that the indicator 27 will indicate "radio telephone". The controller 29 controls the transmitter 2 and the receiver 3 of the radio telephone unit A at the step S34 so that speech communication can be enabled via the radio telephone unit A. Then, the user generally operates the dial input device 24 and inputs a dial signal into the controller 29 via the dial input device 24. The controller 29 controls the transmitter 2 of the radio telephone unit A in response to the input dial signal so that a corresponding RF dial signal will be transmitted toward the base station 200 via the transmitter 2. Subsequently, speech communication can be performed via the radio telephone unit A. When speech communication is completed, the user generally changes the operation-mode selection switch 26 to the stand-by position. In response to this change of the operation-mode selection switch 26, the controller 29 functions to execute an operation similar to the previously-mentioned stand-by operation.

In the case where the current position of the active-unit selection switch 25 corresponds to "radio telephone", the controller 29 makes the transistors 17 and 18 nonconductive so that the transmitter 9 and the receiver 10 of the cordless telephone unit B will be deactivated. In this case, when the operation-mode selection switch 26 assumes the stand-by position, the controller 29 makes the transistor 16 conductive so that the receiver 3 of the radio telephone unit A will be activated. Subsequent stand-by operation and calling operation are similar to the previously-mentioned stand-by operation and calling operation which are executed in the case where the active-unit selection switch 25 is in the auto position.

In the case where the current position of the active-unit selection switch 25 corresponds to "cordless telephone", the controller 29 makes the transistors 15 and 16 nonconductive so that the transmitter 2 and the receiver 3 of the radio telephone unit A will be deactivated. In addition, the controller 29 controls the switch 21 so that the microphone 19 and the loudspeaker 20 will be connected to the cordless telephone unit B. In this case, when the operation-mode selection switch 26 assumes the stand-by position, the controller 29 makes the transistor 18 conductive so that the receiver 9 of the cordless telephone unit B will be activated. Subsequent stand-by operation and calling operation are similar to the previously-mentioned stand-by operation and calling operation which are executed in the case where the active-unit selection switch 25 is in the auto position.

In the case where the operation-mode selection switch 26 is in the off position, the controller 29 makes the transistors 15, 16, 17, and 18 nonconductive regardless of the position of the active-unit selection switch 25.

What is claimed is:

1. A radio telephone comprising:
   a cordless telephone fixed set connected to a telephone line; and
   a mobile set including a first transmitter and a first receiver for radio communication with the cordless telephone fixed set, the mobile set including a second transmitter and a second receiver for cellular radio communications with an external cellular base station;
   wherein the mobile set comprises:
   selection means for selecting one of a portable cellular only mode, a cordless only mode, and an auto mode for initiating a telephone communication;
   means for instructing a communications start;
   means for detecting an answer signal outputted from the cordless telephone fixed set;
   means for, in cases where the selection means selects the portable cellular only mode, activating the second transmitter and the second receiver to enable cellular radio communications with the external cellular base station when the instructing means instructs the communications start;
   means for, in cases where the selection means selects the cordless only mode, activating the first transmitter and the first receiver to execute radio communications with the cordless telephone fixed set when the instructing means instructs the communications start;
   means for, in cases where the selection means selects the auto mode, enabling the first transmitter to transmit a talking start signal when the instructing means instructs the communications start; and
   means for, in cases where the first transmitter transmits the talking start signal but the detecting means fails to detect the answer signal, enabling the second transmitter to transmit a talking start signal.

2. A combined cellular and cordless telephone device operable in (i) a cordless mode of operation for placing and receiving telephone calls through a telephone network by establishing radio communications with a dedicated local low power cordless base station and (ii) a cellular mode of operation for placing and receiving telephone calls through said telephone network by establishing radio communications with a remote cellular communications site, said telephone device comprising:
   a selector for selectively operating said telephone device in an operating mode selected from: (i) a cordless only mode, (ii) a cellular only mode, and (iii) an automatic mode of operation;
   call initiation means for supplying a communications start signal;
   cordless availability detector means for detecting an answer signal from the cordless base station and, in response supplying a cordless detection signal indicating presence and absence of the answer signal; and
   control means responsive to said operating mode, said cordless detection signal and said communications start signal for:
   (i) initiating establishment of communications with the cordless base station in response to said communications start signal when said telephone device is in said cordless only mode of operation,
   (ii) initiating establishment of communications with the cellular communications site in response to said communications start signal when said telephone device is in said cellular only mode of operation, and
   (iii) when said telephone device is in said automatic mode,
      (a) initiating establishment of communications with the cordless base station in response to said communications start signal and subsequently, in response to an indication by said cordless detection signal of absence of the answer signal,
      (b) automatically initiating establishment of communications with the cellular communications site.

3. The telephone device according to claim 2 including a cellular telephone radio transmitter and receiver for establishing radio communications with the cellular communications site and cordless radio telephone transmitter and receiver for establishing radio communications with the cordless base station.

4. A combined cellular and cordless telephone device for selectively establishing radio communications with a (i) dedicated, single user, local cordless base station and (ii) a remote cellular communications site, said telephone device comprising:

cordless radio transmitter and receiver means responsive to a first control signal for initiating radio communications with the dedicated, single user, cordless base station;

cellular radio transmitter and receiver means responsive to a second control signal for initiating radio communications with the remote cellular communications site;

a selector for selectively operating said telephone device in an operating mode selected from: (i) a cordless only mode, (ii) a cellular only mode, and (iii) an automatic mode of operation;

call initiation means for supplying a communications start signal;

cordless availability detector means for detecting an answer signal from the cordless base station and, in response supplying a cordless detection signal indicating presence and absence of the answer signal; and control means responsive to said operating mode, said cordless detection signal and said communications start signal for:

(i) supplying said first control signal for initiating establishment of radio communications with the cordless base station in response to said communications start signal when said telephone device is in said cordless only mode of operation, (ii) supplying said second control signal for initiating establishment of radio communications with the cellular communications site in response to said communications start signal when said telephone device is in said cellular only mode of operation, and (iii) when said telephone device is in said automatic mode, supplying said first control signal for initiating establishment of radio communications with the cordless base station in response to said communications start signal and, subsequently, in response to an indication by said cordless detection signal of absence of the answer signal, supplying said second control signal for automatically initiating establishment of communications with the cellular communications site.

* * * * *